United States Patent
Brongniart et al.

(10) Patent No.: US 6,531,175 B1
(45) Date of Patent: *Mar. 11, 2003

(54) BÉCHAMEL SAUCE

(75) Inventors: Laurence Brongniart, L'Isle Adam (FR); Fabiana Ferrari-Philippe, Beauvais (FR)

(73) Assignee: Nestec S.A., Vevey (CH)

( * ) Notice: Subject to any disclaimer, the term of this patent is extended or adjusted under 35 U.S.C. 154(b) by 133 days.

This patent is subject to a terminal disclaimer.

(21) Appl. No.: 09/617,953

(22) Filed: Sep. 14, 2000

Related U.S. Application Data

(63) Continuation-in-part of application No. 09/400,917, filed on Sep. 22, 1999, now abandoned.

(30) Foreign Application Priority Data

Sep. 22, 1998 (EP) .............................. 98203177

(51) Int. Cl.$^7$ .............................. A23L 1/238; A23L 1/40
(52) U.S. Cl. ...................................... 426/589
(58) Field of Search ......................................... 426/589

(56) References Cited

U.S. PATENT DOCUMENTS

| | | | | |
|---|---|---|---|---|
| 2,811,452 A | * | 10/1957 | Lesparre et al. ............ | 426/589 |
| 4,671,966 A | * | 6/1987 | Giddey et al. ............... | 426/578 |
| 5,759,581 A | * | 6/1998 | Baensch et al. .............. | 127/32 |
| 6,171,634 B1 | * | 1/2001 | Marjanovic et al. ........ | 426/516 |

FOREIGN PATENT DOCUMENTS

| | | | |
|---|---|---|---|
| EP | 0 689 770 | * | 1/1996 |
| JP | 61 173758 | | 8/1986 |
| WO | WO 96 03057 | | 2/1996 |

OTHER PUBLICATIONS

Thebaudin, J.Y., Lefebvre, A.C., Doublier, J.L., "Rheology of Starch Pastes from Starches of Different Origins," Lebensmittel–Wissenschaft Und–Technologie, vol. 31, No. 4, Jan. 1998, pp. 354–360.

* cited by examiner

*Primary Examiner*—Keith Hendricks
(74) *Attorney, Agent, or Firm*—Winston & Strawn

(57) ABSTRACT

The invention relates to a béchamel sauce and a method of making the sauce. The béchamel sauce may be a classical béchamel sauce and exhibits less than a 10% variation in viscosity, measured at 10 s$^{-1}$, for two separate shear treatments conducted before and after one or more freeze-thaw cycles. The béchamel sauce contains 0.3–2%, with respect to the amount of flour contained in the sauce, of an emulsifier. Preferred emulsifiers include lecithin, a stearoyl lactylate, a monoglyceride, a diacetyl tartaric acid ester of a monoglyceride and mixtures thereof.

20 Claims, No Drawings

BÉCHAMEL SAUCE

CROSS REFERENCE TO RELATED APPLICATIONS

Continuity Statement

This application is a continuation-in-part application of application Ser. No. 09/400,917, filed Sep. 22, 1999, now abandoned.

TECHNICAL FIELD

The present invention relates to a béchamel-type sauce having improved properties such as freeze-thaw resistance.

BACKGROUND ART

It is a well known tradition to produce béchamel-type sauces. Larousse Gastronomique, published by Larousse in 1996, describes the preparation of a béchamel-type sauce in which butter is melted over a low heat and then flour is added while stirring vigorously in order to obtain a smooth colorless mixture. Milk is then poured into the mixture while whipping so as to avoid forming lumps. The béchamel sauce thus formed is seasoned with salt and pepper and then passed through a conical tammy strainer so that it has a really smooth texture.

In addition, Patent JP 61,173,758 describes the preparation of a roux in which the fat and a fatty acid sucroester are mixed with starch, so as to lower the gel temperature of the starch when making the roux.

Such sauces often have a texture which is rough on the palate and, during storage, undergoes significant change in their physical structure and in their organoleptic properties. These changes may be irreversible.

The object of the present invention is to remedy the deficiencies of the prior art by providing a béchamel sauce which exhibits greater shear and freeze-thaw stability, has a shiny appearance and a homogeneous, smooth and creamy texture.

SUMMARY OF INVENTION

The present invention relates to a classical béchamel sauce having less than a 10% variation in viscosity, measured at 10 $s^{-1}$, either for two separate shear treatments or before and after at least one freeze-thaw cycle. The viscosity may be measured at two different rotation speeds that vary by at least about 80 revolutions per minute and the viscosity variation may be maintained for measurements made both before and after freeze-thaw cycles. The viscosity may be determined for shear treatments at a rotation speed of 150 revolutions per minute and 300 revolutions per minute. The viscosity may be determined after a freeze-thaw cycle wherein the béchamel sauce is frozen at −30° C. for at least 3 hours and thawed at 20–30° C. for 2–8 hours.

The classical béchamel sauce of the invention has a water content of about 68 to 95% by weight and includes about 0.3 to 1.6% by weight of salt; about 1.6 to 10% by weight of fat; about 0.1 to 10% by weight of milk; about 0.2 to 6% by weight of modified starch; about 2.7 to 10% by weight of flour; and about 0.3 to 2%, by weight of the flour, of an emulsifier. The fat may be sunflower oil, soybean oil, olive oil, groundnut oil, palm oil, rapeseed oil, butter, margarine, or a mixture thereof.

The modified starch may be modified potato starch, corn starch, wheat starch, tapioca starch, or a mixture thereof. The flour may be soft wheat flour, hard wheat flour, rice flour, corn flour, or a mixture thereof. The emulsifier may be lecithin, a stearoyl lactylate, a monoglyceride, a diacetyl tartaric acid ester of monoglycerides, or a mixture thereof. The classical béchamel sauce may further include a coloring, a cheese, a herb, a spice, or mixtures thereof. The classical bechamel sauce has a smooth, creamy texture and a shiny appearance.

The invention is also directed to a ready cooked meal comprising the classical béchamel sauce of the invention. The meal may be a lasagne dish, a meat dish, or a fish dish.

The invention is also directed to a method of making a béchamel sauce. The method includes the steps of mixing water, salt, fat, milk, modified starch, flour, and an emulsifier to provide a mixture; heating the mixture to provide a sauce; and cooling the sauce to provide a béchamel sauce having less than a 10% variation in viscosity, measured at 10 $s^{-1}$, either for two separate shear treatments or before and after at least one freeze-thaw cycle. The mixture may be heated from about 90° to 100° C. for about 3 to 10 minutes. In one embodiment the mixture is heated in a scraped-surface heat exchanger for about 3 to 4 minutes. The sauce may be cooled in a scraped-surface heat exchanger having an internal diameter of about 120 to 180 mm and scraper blades rotating at a speed of about 100 to 300 rpm. The sauce has a water content of about 68 to 95% by weight; and includes about 0.3 to 1.6% by weight of salt; about 1.6 to 10% by weight of fat; about 0.1 to 10% by weight of milk; about 0.2 to 6% by weight of modified starch; about 2.7 to 10% by weight of flour; and about 0.3 to 2%, by weight of the flour, of an emulsifier.

DETAILED DESCRIPTION OF THE PREFERRED EMBODIMENTS

The invention is directed to a béchamel sauce that exhibits less than a 10% variation in viscosity, measured at 10 $s^{-1}$, either for two separate shear treatments at different rotational speeds or before and after one or more freeze-thaw cycles. Preferably, this small variation is maintained both before and after the freeze-thaw cycles(s).

In the present description, the expression "béchamel sauce" is used to denote, in particular, both white sauces and other sauces based on flour, oil or fat, and water, with or without the addition of powdered milk. Preferably the béchamel sauce is a "classical béchamel sauce." The expression "classical béchamel sauce", as used herein means a béchamel sauce prepared by melting butter over low heat, then adding flour while stirring vigorously to provide a smooth substantially colorless mixture, and then adding milk to the mixture while whipping to avoid forming lumps. The resulting classical béchamel sauce may optionally be seasoned, for example, with salt and pepper and may optionally be passed through a strainer, such as, for example, a conical tammy strainer to provide a sauce with an even smoother texture. Larousse Gastronomique, published by Larousse in 1996 describes the preparation of a classical béchamel sauce.

The béchamel sauce of the invention may have, for example, a water content of about 68 to 95% by weight and comprise about 0.3 to 1.6% by weight of salt, about 1.6 to 10% by weight of fat, about 0.1 to 10% by weight of milk, about 0.2 to 6% by weight of modified starch, and about 2.7 to 10% by weight of flour.

Preferably, the béchamel sauce according to the present invention comprises an emulsifier in an amount of about 0.3 to 2 percent by weight based on the amount of flour. Representative emulsifiers include, but are not limited to, lecithin, a stearoyl lactylate, a monoglyceride or a diacetyl tartaric acid ester of monoglycerides (DATEM), for example. The béchamel sauce according to the present invention exhibit less than a 10% variation in viscosity measured at 10 s$^{-1}$, for two separate shear treatments and/or after one or more freeze-thaw cycles. In other words the béchamel sauce exhibits shear and/or freeze-thaw stability.

The béchamel sauce can be prepared by mixing all the ingredients in a conventional mixer found in the food industry, heating and cooking at a temperature of about 90–100° C. for about 3–10 minutes, and cooling to room temperature.

The heating and cooking may be carried out in a double-walled vessel with a stirrer for about 5–10 minutes, or preferably, as a result of the shear stability of the sauce, in a scraped-surface heat exchanger for about 3–4 minutes, for example.

The cooling may be carried out by leaving the sauce to stand at room temperature and pressure, or under vacuum, or preferably, as a result of the shear stability of the sauce, in a scraped-surface heat exchanger, for example.

During cooling, the sauce is typically subjected to the shear caused by the about 100–330 rpm rotation of the two rotor blades or scraper blades in the scraped-surface heat exchanger which has an internal diameter of about 120 to 180 mm.

The viscosity of the béchamel-type sauce according to the present invention can be measured in a Rheometrics Fluids Spectrometer RFS II viscometer sold by Rheometrics Scientific, Espace Descartes, 7, rue Albert Einstein, F-77420 CHAMP SUR MARNE.

Surprisingly, it has been found that the béchamel sauce according to the invention exhibits greater stability on cooling after cooking in that the viscosity varies by less than 10% for measurements made at two rotation speeds that differ by at least about 80 evolutions per minute. Viscosity measurements are preferably taken at rotation speeds of the scraper blades of 150 and 300 revolutions per minute in an exchanger having an internal diameter of 150 mm. In addition, the sauce possesses better storage stability, in particular after one or more freeze-thaw cycles comprising a freezing step at about −30° C. for at least 3 hours and a thawing step at about 20–30° C. for 2–8 hours, for example.

The béchamel sauce according to the present invention may therefore have a water content of about 68–95% by weight and comprise, in percent by weight of sauce, about 0.3 to 1.6% by weight of salt, about 1.6 to 10% by weight of fat, about 0.1 to 10% by weight of milk, about 0.2 to 6% by weight of modified starch, about 2.7 to 10% by weight of flour as well as, in percent by weight of the flour, about 0.3 to 2% of an emulsifier such as lecithin, a stearoyl lactylate, a monoglyceride or a diacetyl tartaric acid ester of monoglycerides (DATEM).

The emulsifiers, because of their interactions with the other ingredients contained in the béchamel sauce, especially with the flour, allow for a sauce having a good texture to be made.

The fat, which has an effect on the texture of the béchamel sauce and on its taste, may be sunflower oil, soybean oil, olive oil, groundnut oil, palm oil, rapeseed oil, butter or margarine, for example.

The milk may be powdered, whole or skimmed milk, for example.

The modified starch may be modified potato, corn, wheat or tapioca starch, for example. Modified starch may be incorporated into the béchamel sauce preparation to improve the sauces stability during its preparation and during its storage at chilled temperatures or at freezing temperatures.

The flour, which has a binding effect, may be soft wheat, hard wheat, rice or corn flour, for example.

It is also possible to incorporate into the béchamel sauce of the present invention colorings, cheese, herbs, and/or spices, for example.

The béchamel sauce according to the present invention has a shiny appearance and a smooth and creamy texture.

This béchamel sauce exhibits greater shear and freeze-thaw stability. It also exhibits good storage stability as a result of low water loss.

Advantageously, this béchamel sauce can be used for the manufacture of frozen or chilled ready-cooked meals, especially lasagne dishes, meat dishes, and fish dishes.

EXAMPLES

The present invention is described in greater detail with the aid of the non-limiting tests and examples below. In these tests and examples, percentages are given by weight unless otherwise indicated.

Test 1: Comparative measurements of the viscosity of béchamel sauces subjected to various shear levels during cooling and to several freeze-thaw cycles A control béchamel sauce 1 without emulsifier (specimen 1), a control béchamel sauce 2 containing an emulsifier which lies outside the scope of the present invention (specimen 2) and 4 béchamel sauces according to the present invention (specimens 3, 4, 5 and 6) were prepared. The viscosity measurements of these 6 sauces were then compared at two shear speeds applied during cooling in a scraped-surface exchanger.

For the preparation of the control béchamel sauce, 16.12 kg of water, 0.16 kg of salt, 0.8 kg of sunflower oil, 1.6 kg of powdered milk, 0.32 kg of modified corn starch, and 1 kg of flour were mixed, with stirring, at 95° C. for 10 minutes.

Next, the béchamel sauce thus produced was cooled to 12° C. in a Contherm-type scraped-surface exchanger (sold by Alfa Laval). Two different shear speeds were applied (150 and 300 revolutions per minute).

For the preparation of the 5 béchamel sauces containing an emulsifier, the procedure was the same as described above except that, for each of these sauces, 1.5% of an emulsifier, with respect to the amount of flour, was added to the initial mixture.

The viscosity of each of these sauces was then measured using the Rheometrics Fluids Spectrometer RFS II viscometer sold by Rheometrics Scientific, Espace Descartes, 7, rue Albert Einstein, F-77420 CHAMP SUR MARNE. A flow curve for shear rates from 0 to 500 s$^{-1}$ was recorded. The viscosity value at 10 s$^{-1}$ was read from the curve. The measurements were made on the cooled sauces at a rotation speed of 150 revolutions per minute and on the cooled sauces at a rotation speed of 300 revolutions per minute. For each specimen, the variation in viscosity of the cooled sauce at 150 revolutions per minute was compared with that of the cooled sauce at 300 revolutions per minute.

In a similar manner, the viscosity of each of the six sauces was compared before and after three freeze-thaw cycles. Each cycle comprising freezing and storing at −30° C. for at least 8 days followed by a thawing step at +30° C. for 2 hours.

The viscosity measurements are given in Table 1 below.

TABLE I

| Béchamel sauce Specimen No. | Emulsifier | Variation in viscosity measured at 10 s$^{-1}$ for two shear speeds during the process | Variation in viscosity measured at 10 s$^{-1}$ before and after three freeze-thaw cycles |
|---|---|---|---|
| 1 (control 1) | — | 19.93% | 12.24% |
| 2 (control 2) | sucroglyceride | 13.53% | 31.87% |
| 3 | lecithin | 9.73% | 8.9% |
| 4 | stearoyl lactylate | 0.32% | 19.62% |
| 5 | monoglyceride | 8.59% | 3.37% |
| 6 | diacetyl tartaric acid ester of a monoglyceride | 9.68% | 0.36% |

The measurements given in Table 1 demonstrate that the béchamel sauces according to the present invention have a texture which is more stable to shear and/or to freezing-thawing than the control béchamel sauce 1 (with no emulsifier) and the control béchamel sauce 2 (with an emulsifier outside the scope of the present invention). The variation in viscosity of the béchamel sauces prepared according to the present invention between the two shear speeds both before and after three freeze-thaw cycles was less than 10%.

Example 1

Lasagne were prepared using a béchamel sauce according to the present invention.

A béchamel sauce was prepared by mixing, with stirring, at 95° C. for 10 minutes, 7.58 kg of water, 0.06 kg of salt, 0.96 kg of sunflower oil, 0.9 kg of powdered milk, 0.14 kg of modified corn starch, 0.4 kg of flour, and 0.004 kg of DATEM.

The béchamel sauce thus prepared was then cooled to 12° C.

In parallel, a Bolognese-type sauce was prepared by mixing 3.4 kg of peeled tomatoes, 0.8 kg of sunflower oil, 2.7 kg of water, 0.7 kg of carrots, 1.6 kg of ground meat, 0.8 kg of onions, 0.02 kg of basil, 0.1 kg of salt, and 0.1 kg of pepper.

A layer of lasagne pasta was placed on the bottom of a rectangular dish and a layer of Bolognese-type sauce was deposited on the layer of lasagne pasta. Three superpositions were formed in this way before a last layer of lasagne pasta was deposited and covered with a layer of béchamel sauce prepared according to the present invention.

What is claimed is:

1. A béchamel sauce comprising butter, a modified starch and an emulsifier selected from the group consisting of lecithin, a stearoyl lactylate, a monoglyceride, a diacetyl tartaric acid ester of monoglycerides, and mixtures thereof, and having less than a 10% variation in viscosity, measured at 10 s$^{-1}$, conducted before and after at least one freeze-thaw cycle.

2. The béchamel sauce of claim 1, having a viscosity variation of no more than about 9.73% which variation is maintained for measurements made both before and after at least two freeze-thaw cycles.

3. The béchamel sauce of claim 1, wherein the viscosity is less than about 9.73% and is also determined for shear treatments at a rotation speed of 1150 revolutions per minute and 300 revolutions per minute.

4. The béchamel sauce of claim 1, wherein the viscosity is less than about 9.73% as determined after a freeze-thaw cycle wherein the béchamel sauce is frozen at −30° C. for at least 3 hours and thawed at 20–30° C. for 2–8 hours.

5. A béchamel sauce having less than a 10% variation in viscosity, measured at 10 s$^{-1}$, conducted before and after at least one freeze-thaw cycle, and comprising a water content of about 68 to 95% by weight, about 0.3 to 1.6% by weight of salt; about 1.6 to 10% by weight of fat; about 0.1 to 10% by weight milk; 0.2 to 6% by weight of modified starch; about 2.7 to 10% by weight of flour; and about 0.3 to 2% by weight of the flour of an emulsifier selected from the group consisting of lecithin, a stearoyl lactylate, a monoglyceride, a diacetyl tartaric acid ester of monoglycerides, and mixtures thereof.

6. The béchamel sauce of claim 5, wherein the fat is sunflower oil, soybean oil, olive oil, groundnut oil, palm oil, rapeseed oil, butter, margarine, or a mixture thereof.

7. The béchamel sauce of claim 5, wherein the modified starch is modified potato starch, corn starch, wheat starch, tapioca starch, or a mixture thereof.

8. The béchamel sauce of claim 5, wherein the flour is soft wheat flour, hard wheat flour, rice flour, corn flour or a mixture thereof.

9. The béchamel sauce of claim 5, further comprising a coloring, a cheese, a herb, a spice or mixtures thereof.

10. The béchamel sauce of claim 1, having a smooth, creamy texture and a shiny appearance.

11. A ready cooked meal comprising the béchamel sauce of claim 1 and an additional food component.

12. The ready cooked meal of claim 11, wherein the meal is a lasagne dish, a meat dish, or a fish dish.

13. A method of making a béchamel sauce comprising:

mixing water, salt, fat, milk, modified starch, flour, and an emulsifier to provide a mixture;

heating the mixture to provide a sauce; and cooling the sauce to provide a béchamel sauce having less than a 10% variation in viscosity, measured at 10s$^{-1}$, either for two separate shear treatments or before and after at least one freeze-thaw cycle.

14. The method of claim 13, wherein the mixture is heated from about 90 to 100° C. for about 3 to 10 minutes.

15. The method of claim 14, wherein the mixture is heated in a scraped-surface heat exchanger for about 3 to 4 minutes.

16. The method of claim 13, wherein the sauce is cooled in a scraped-surface heat exchanger having an internal diameter of about 120 to 180 mm and scraper blades rotating at a speed of about 100 to 300 rpm.

17. The method of claim 13, wherein the sauce comprises a water content of about 68 to 95% by weight; about 0.3 to 1.6% by weight of salt; about 1.6 to 10% by weight of fat; about 0.1 to 10% by weight of milk; about 0.2 to 6% by weight of modified starch; about 2.7 to 10% by weight of flour; and about 0.3 to 2%, by weight of the flour, of an emulsifier.

18. A ready cooked meal comprising the béchamel sauce of claim 5 and an additional food component.

19. A béchamel sauce comprising butter, a modified starch and an emulsifier selected from the group consisting of lecithin, a stearoyl lactylate, a monoglyceride, a diacetyl tartaric acid ester of monoglycerides, and mixtures thereof, and having less than a 10% variation in viscosity, measured at 10 s$^{-1}$, conducted before and after at least one freeze-thaw cycle, and wherein the viscosity is also measured at two different rotation speeds that vary by at least about 80 revolutions per minute.

20. A ready cooked meal comprising the béchamel sauce of claim 19 and an additional food component.

* * * * *